United States Patent
Lee et al.

(10) Patent No.: US 8,000,427 B2
(45) Date of Patent: Aug. 16, 2011

(54) APPARATUS AND METHOD FOR LOW-COMPLEXITY SCHEDULING IN MULTI-USER MIMO SYSTEM

(75) Inventors: Hak-Ju Lee, Incheon (KR); David Mazzarese, Suwon-si (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 962 days.

(21) Appl. No.: 11/837,295

(22) Filed: Aug. 10, 2007

(65) Prior Publication Data

US 2008/0037671 A1 Feb. 14, 2008

(30) Foreign Application Priority Data

Aug. 10, 2006 (KR) .................. 10-2006-0075582

(51) Int. Cl.
*H04L 7/00* (2006.01)
(52) U.S. Cl. .................. 375/358; 455/452.2
(58) Field of Classification Search .................. 375/358, 375/356; 455/452.2, 452.1, 435.1, 435.2, 455/425
See application file for complete search history.

(56) References Cited

U.S. PATENT DOCUMENTS

| 7,463,601 B2 | 12/2008 | Lee et al. | |
|---|---|---|---|
| 2007/0058590 A1 * | 3/2007 | Wang et al. | 370/334 |

FOREIGN PATENT DOCUMENTS

| CN | 1592144 | 3/2005 |
|---|---|---|
| EP | 1 505 741 | 2/2005 |
| KR | 1020050043783 | 5/2005 |
| WO | WO 03/041300 | 5/2003 |

OTHER PUBLICATIONS

Primolevo et al., "Channel Aware Scheduling for Broadcast MIMO Systems with Orthogonal Linear Precoding and Fairness Constraints", 2005.
Lee et al.: An Eigen-Based MIMO Multiuser Scheduler Robust to Spatial Channel Correlation, vol. 2, May 30, 2005.
Berenguer et al.: Opportunistic User Scheduling and Antenna Selection in the Downlink of Multiuser MISO Systems, vol. 2, May 30, 2005.

* cited by examiner

*Primary Examiner* — Kevin Y Kim
(74) *Attorney, Agent, or Firm* — The Farrell Law Firm, P.C.

(57) ABSTRACT

Provided is an apparatus and method for low-complexity scheduling in a multi-user Multi-Input Multi-Output (MIMO) system. In a method for scheduling in a MIMO system, a vector is set on the basis of channel information for all user terminals. A scalar for the vector is initialized. A user terminal that has the greatest scalar among unselected user terminals is selected. A user set is updated by adding the selected user terminal therein. The vector and the scalar for a user terminal not included in the user set are updated. Accordingly, a high transmission capacity can be provided while minimizing the influence of an interference signal. Also, the computation amount can be reduced greatly.

14 Claims, 3 Drawing Sheets

APPARATUS AND METHOD FOR LOW-COMPLEXITY SCHEDULING IN MULTI-USER MIMO SYSTEM

PRIORITY

This application claims priority under 35 U.S.C. §119(a) to an application filed in the Korean Intellectual Property Office on Aug. 10, 2006 and assigned Serial No. 2006-75582, the contents of which are incorporated herein by reference.

BACKGROUND OF THE INVENTION

1. Field of the Invention

The present invention relates generally to a Multi-Input Multi-Output (MIMO) system, and in particular, to an apparatus and method for low-complexity scheduling in a multi-user MIMO system.

2. Description of the Related Art

It is known that a MIMO channel can provide very high transmission efficiency, especially in multi-user environments.

In the multi-user environments, a sum capacity (i.e., a maximum sum of transmission rates) can be achieved by allocating the same resource to a plurality of users simultaneously. The terms 'user' and 'user terminal' will be interchangeably used herein. In a case of a system using N transmission (hereinafter, "TX") antennas, the sum capacity (i.e., the theoretical maximum transmission capacity) can be approached by allocating the same resource to up to N users simultaneously in consideration of the complexity of a transmitter. However, the selection of N users for maximization of the transmission capacity is not practically viable because the selection requires a very high complexity.

Several techniques have been proposed to suppress a multi-user interference for the maximization of the transmission capacity. For minimization of the multi-user interference, the above conventional techniques select users, one-by-one, on the basis of channel information fed back from all of the users, which necessitates performing a large amount of computation at a corresponding transmitter. The amount of computation for multi-user selection is determined according to the number of TX antennas and the number of users that will receive data simultaneously. The conventional techniques can reduce the computation amount in linear proportion to the number of users. However, the conventional techniques are not practically viable in real time at a cellular base station because they still require the computation amount corresponding to the fifth-order term of the number of TX antennas.

Hereinafter, a description will be given of a conventional scheduling technique based on a successive projection scheme, assuming that there are K users within the coverage of a serving base station with N TX antennas. The conventional scheduling technique selects a user of a channel that is least correlated with a channel of previously-selected users, i.e., the $k^{th}$ user is selected as Equation (1):

$$u_k = \mathop{\text{argmax}}_{1 \le i \le K,\, i \notin S_{k-1}} \left[ \mathop{\text{min}}_{(\alpha_1,\ldots,\alpha_{k-1}) \in R^{k-1}} \left\| \sum_{j \in S_{k-1}} \alpha_j h_j - h_i \right\|^2 \right] \quad (1)$$

where $u_k$ is an index of the $k^{th}$ user, $h_i$ is a (1×N) vector of complex numbers that indicates a channel between the $i^{th}$ user and a transmitter, $S_{k-1}=\{u_1,\ldots,u_{k-1}\}$ is a set of previously-selected user indexes, $\alpha=(\alpha_1,\ldots,\alpha_{k-1}) \in R^{k-1}$ is a vector that indicates a coefficient for indicating all possible linear combinations from channel information of users selected until the $(k-1)^{th}$ stage, and R is a set of real numbers.

At the $k^{th}$ stage, a user having a channel most orthogonal to a channel of the previously-selected users is selected as Equation (1). Therefore, the user selected at the $k^{th}$ stage has the least interference influence on the previously-selected users.

Assuming that $H_{S_{k-1}}$ is a matrix corresponding to the accumulation of user channels selected until the $(k-1)^{th}$ stage, Equation (1) can be transformed into a matrix format expressed as Equation (2):

$$u_k = \mathop{\text{argmax}}_{1 \le i \le K,\, i \notin S_{k-1}} \left\| h_i \left[ H^*_{S_{k-1}} (H_{S_{k-1}} H^*_{S_{k-1}})^{-1} H_{S_{k-1}} - I_N \right] \right\|^2 \quad (2)$$

where $I_N$ is an (N×N) identity matrix.

The above process is repeated until N users, which will receive data simultaneously, are selected among the K users.

However, a matrix product and an inverse matrix must be computed in order to determine one $k^{th}$ user in the above process, where the size of the inverse matrix increases with an increase in k. Moreover, the computation amount increases because a comparison operation must be performed on all of users that have not yet been selected.

SUMMARY OF THE INVENTION

An aspect of the present invention is to substantially solve at least the above problems and/or disadvantages and to provide at least the advantages below. Accordingly, an object of the present invention is to provide an apparatus and method for low-complexity scheduling in a multi-user MIMO system.

Another aspect of the present invention is to provide an apparatus and method for low-complexity scheduling in a multi-user MIMO system, which can provide both a high transmission capacity and a low complexity by selecting a set of user terminals with the highest transmission capacity among multi-antenna users.

According to one aspect of the present invention, a method for scheduling in a MIMO system includes setting a vector on a basis of channel information for all user terminals and initializing a scalar for the vector; selecting a user terminal that has a greatest scalar among unselected user terminals; updating a user set by adding the selected user terminal therein; and updating the vector and the scalar for a user terminal not included in the user set.

According to another aspect of the present invention, an apparatus for scheduling in a MIMO system a channel state feedback unit for estimating a channel state and feeding back channel state information; and a multi-user scheduler for setting a vector on a basis of channel information for all user terminals, initializing a scalar for the vector, selecting a user terminal that has a greatest scalar among unselected user terminals, updating a user set by adding the selected user terminal therein, and updating a vector and a scalar for a user terminal not included in the user set.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, a description will be given of an apparatus and method for low-complexity scheduling in a multi-user MIMO system according to the present invention.

Figure 1:
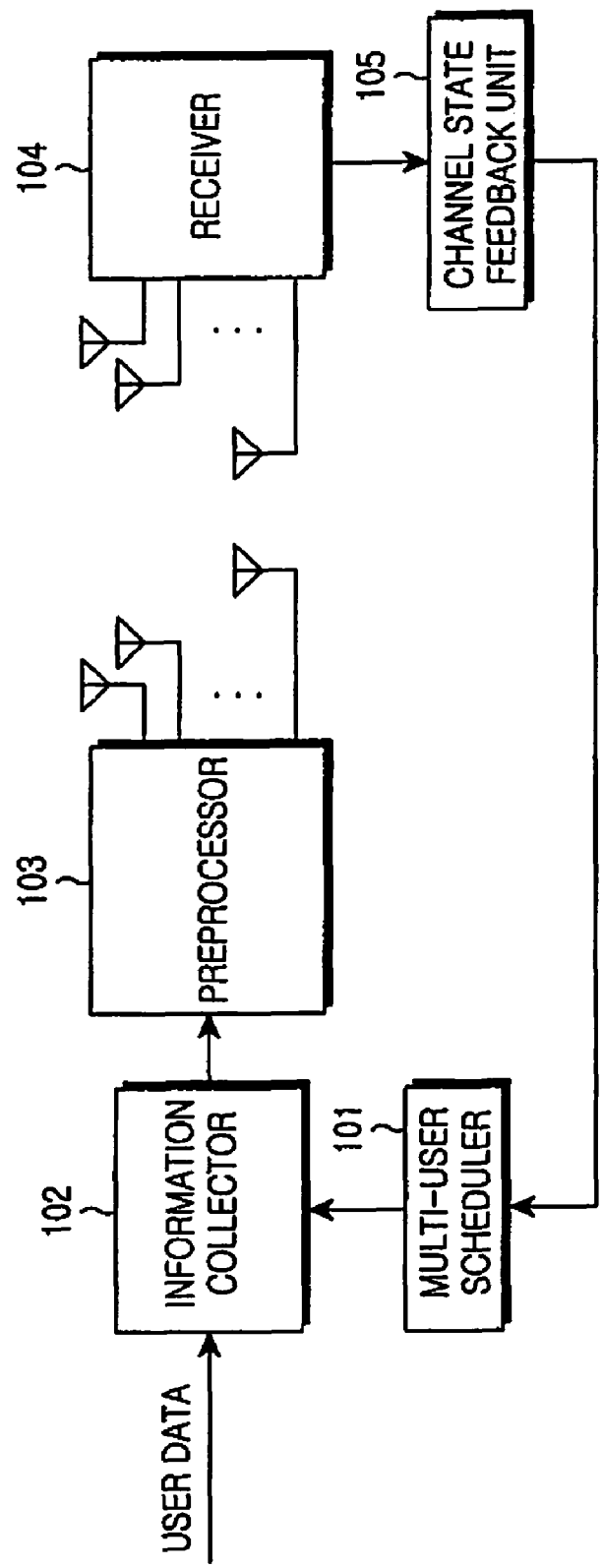
FIG. 1 is a block diagram of a multi-user MIMO system according to the present invention.

FIG. 1 is a block diagram of a multi-user MIMO system according to the present invention.

Referring to FIG. 1, the MIMO system includes a base station and a plurality of user terminals. The terms 'user' and 'user terminal' will be interchangeably used herein. The base station includes a multi-user scheduler 101, an information collector 102, and a preprocessor 103. Each of the user terminals includes a receiver 104 and a channel state feedback unit 105.

Using channel state information received from the respective user terminals, the multi-user scheduler 101 selects a set of users that will receive data simultaneously using the same frequency resource. The multi-user scheduler 101 outputs the selected user set to the information collector 102.

The information collector 102 collects only data corresponding to the selected users, and outputs the collected user data to the preprocessor 103.

In order to transmit data to the selected users simultaneously, the preprocessor 103 generates a TX symbol by preceding the collected user data from the information collector 102 in a predefined scheme. The preprocessor 103 Radio-Frequency (RF)-processes the generated TX symbol for over-the-air transmission, and transmits the resulting data to the respective user terminals through a predetermined number of TX antennas. Because the selected user terminals are designed to have near-orthogonal channels, the preprocessor 103 can be implemented using a simple beamforming technique. For example, when the indexes of the selected user terminals are referred to as $d_1 d_2, \ldots, d_N$, multi-user beamforming vectors $v_{d_1}, v_{d_2}, v_{d_N}$ can be created using the channel information $h_{d_1}, h_{d_2}, \ldots, h_{d_N}$ of the respective user terminals. In a simple embodiment, the preprocessor 103 may be implemented using a Singular Value Decomposition (SVD) precoder that creates a beamforming vector using the first eigenvector of a channel matrix. In this case, a multi-user interference can be minimized because the beamforming vectors of the respective user terminals are also orthogonal to each other. Accordingly, a signal vector transmitted by the base station can be expressed as Equation (3):

$$x = v_{d_1} s_{d_1} + v_{d_2} s_{d_2} + \ldots + v_{d_N} s_{d_N} = \sum_{i=1}^{N} v_{d_i} s_{d_i} \quad (3)$$

where $s_i$ denotes data that must be transmitted to the $i^{th}$ user terminal.

The receiver 104 of each user terminal receives data from the base station through a predetermined number of receive (hereinafter, "RX") antennas, divides the received data into respective streams, and decodes the data streams, thereby outputting desired data. A signal vector received by the receiver 104 of a user terminal $d_i$ can be expressed as Equation (4):

$$y = h_{d_i} \sum_{i=1}^{N} v_{d_i} s_{d_i} + n_{d_i} \quad (4)$$

where $h_{d_i}$ denotes a channel vector received through an RX antenna of the user terminal $d_i$ and $n_{d_i}$ denotes a noise vector received through the RX antenna of the user terminal $d_i$.

For example, a matched filter, a zero-forcing technique, or a Minimum Mean-Square Error (MMSE) technique may be used to extract data from signal received by the receiver 104.

The channel state feedback unit 105 of each user terminal estimates the current channel state to collect channel state information that will be fed back to the base station. The channel state feedback unit 105 transmits the collected channel state information the multi-user scheduler 101 of the base station. The channel state may be estimated using data received from the base station or using resource information received from the base station through a pilot signal.

Figure 2:
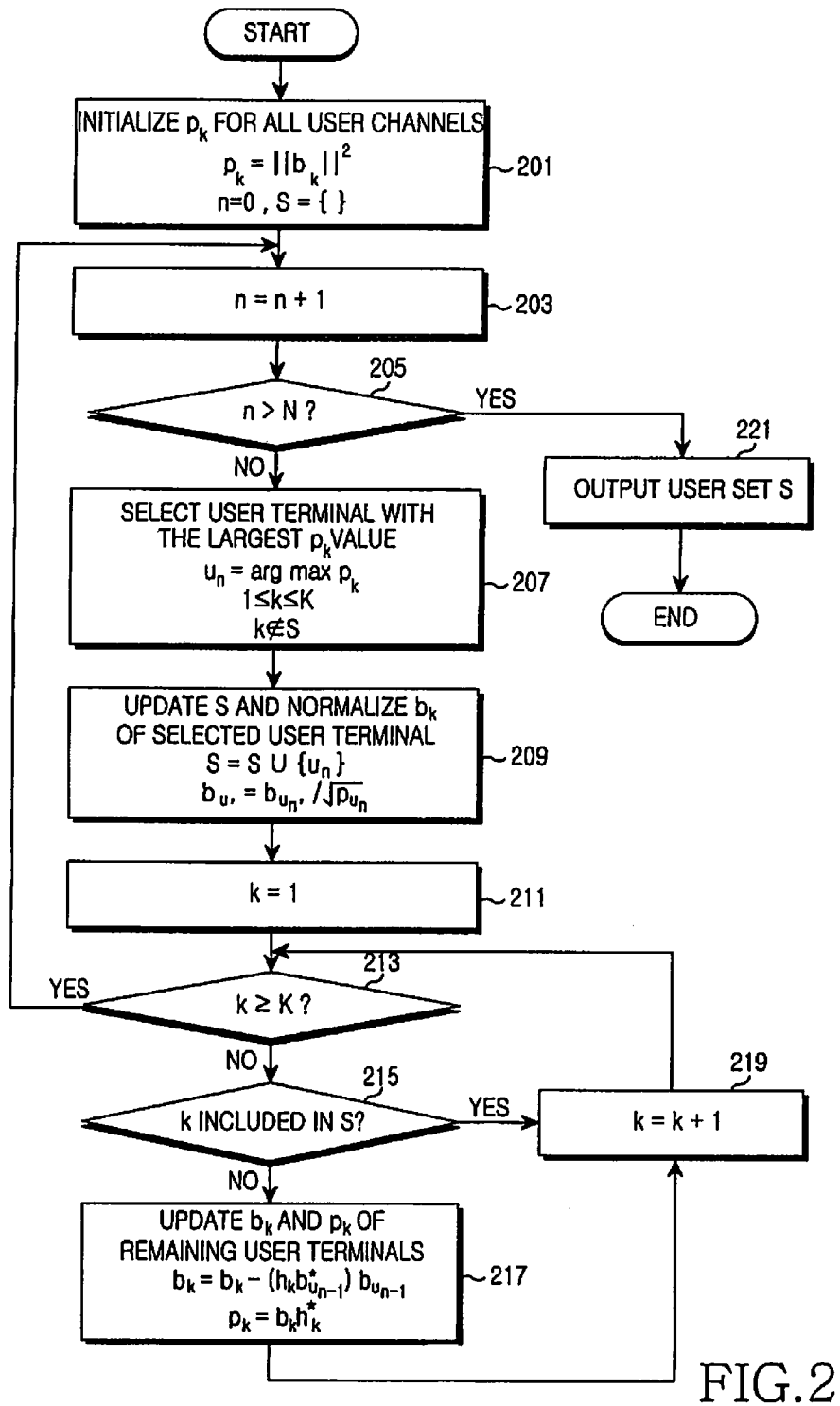
FIG. 2 is a flowchart illustrating a scheduling procedure in a multi-user MIMO system according to an embodiment of the present invention.

FIG. 2 is a flowchart illustrating a scheduling procedure in the multi-user MIMO system according to an embodiment of the present invention.

Referring to FIG. 2, in step 201, the multi-user scheduler 101 of the base station initializes parameters, i.e., a vector $b_k$ and a scalar $p_k$ for the corresponding user channels on the basis of channel state information fed back from all the user terminals, as expressed in Equation (5):

$$b_k = h_k$$

$$p_k = \|b_k\|^2 \quad (5)$$

where $h_k$ is a (1×N) vector of complex numbers that indicates a channel between the kth user terminal and a transmitter, a scalar $p_k$ is a value indicating the channel state of each user terminal (which will be used as a condition value for a scheduling process described below), and k denotes a search parameter for 1 through K user terminals.

In order to select N user terminals by a scheduling process, the multi-user scheduler 101 initializes a user index n to 0 and also initializes a selected user set S to a void set { }, in step 201.

In step 203, the multi-user scheduler 101 updates the user index n to (n+1). In step 205, the multi-user scheduler 101 determines whether the user index n is greater than the number N of user terminals that are to be selected (N is less than or equal to K).

If the n is less than or equal to the N, in step 205, the multi-user scheduler 101 proceeds to step 207. In step 207, the multi-user scheduler 101 selects one user terminal $u_n$ that has the greatest scalar $p_k$ among the unselected user terminals. The selected user terminal $u_n$ has the greatest channel gain among the K user terminals.

The user terminal $u_n$ can be selected as Equation (6):

$$u_n = \underset{\substack{1 \leq k \leq K \\ k \notin S}}{\operatorname{argmax}} p_k \quad (6)$$

In step 209, the multi-user scheduler 101 updates the user set S by adding the selected user terminal $u_n$ in the user set S, and normalizes a channel vector b of the selected user terminal $u_n$. The normalization is a process of dividing a predetermined vector by its size to create a unit vector, thereby equalizing the power effect as in another preselected user terminal.

The update of the user set S and the normalization of the channel vector b of the selected user terminal $u_n$ can be performed as Equation (7):

$$S = S \cup \{u_n\}$$

$$b_{u_n} = b_{u_n}/\sqrt{p_{u_n}} \qquad (7)$$

In step 211, the multi-user scheduler 101 initializes the search parameter k to 1. In step 213, the multi-user scheduler 101 determines whether the k is greater than or equal to the total number K of users. The purpose of this determination is to update the $b_k$ and $p_k$ of the corresponding user terminals by checking the unselected user terminals among all the user terminals. If the k is less than the K, in step 213, the multi-user scheduler 101 proceeds to step 215. In step 215, the multi-user scheduler 101 determines whether the k is included in the selected user set S.

If the k is not included in the selected user set S, in step 215, the multi-user scheduler 101 proceeds to step 217. In step 217, the multi-user scheduler 101 updates a channel vector $b_k$ by projecting the channel vector $b_k$ on a null space of a subspace having the user terminal $u_n$, which is selected in step 207. as the basis, and updates the scalar $p_k$ using the updated channel vector $b_k$.

The $b_k$ and $p_k$ can be updated as Equation (8):

$$b_k = b_k - (h_k b_{u_{n-1}}{}^*) b_{u_{n-1}}$$

$$p_k = b_k h_k{}^* \qquad (8)$$

where * denotes a complex transpose, $b_k$ and $p_k$ are updated to remove the attributes for the preselected user terminals, and $u_{n-1}$ denotes a preselected user terminal.

Thereafter, the multi-user scheduler 101 updates the k to (k+1) in step 219 and returns to step 213.

On the other hand, if the k is included in the selected user set S, in step 215, the multi-user scheduler 101 proceeds directly to step 219 because there is no need to update the condition value. The multi-user scheduler 101 updates the k to (k+1) in step 219 and returns to step 213.

On the other hand, if the k is greater than or equal to the K (in step 213), the multi-user scheduler 101 determines that the condition values for all the user terminals have been updated, and returns to step 203 to select a user terminal that has the greatest condition value $p_k$ among the unselected user terminals. In this way, the multi-user scheduler 101 selects a user terminal causing the least interference in comparison with the channel state information of the user terminals preselected in the previous step. The selected user terminal has the highest orthogonality with respect to the channel state of the preselected user terminal and thus causes the least interference when data of the selected user terminals are transmitted simultaneously. Consequently, the multi-user scheduler 101 can select the greatest Signal-to-Interference and Noise Ratio (SINR), thereby maximizing the channel capacity.

On the other hand, if the n is greater than the N (in step 205), the multi-user scheduler 101 proceeds to step 221, determining that a desired number of user terminals are all selected. The multi-user scheduler 101 outputs the user set S to the information collector 102 in step 221 and then ends the scheduling procedure.

Meanwhile, the present invention can extend or change a scheduling scheme by setting the initial value of the vector $b_k$ using the feedback channel state information. For example, in the case of a proportional fair scheduling scheme, the vector $b_k$ may be initialized as Equation (9):

$$b_k = \sqrt{\rho_k h_k} \qquad (9)$$

where $\rho_k$ denotes channel quality information such as an SINR.

In a case of a subspace-based scheduling scheme, the vector $b_k$ may be initialized to an eigenvector computed using a channel matrix of the $k^{th}$ user terminal, or to the product of the eigenvector and an eigenvalue corresponding to the eigenvector. In this case, multiple antennas must be used in each user terminal.

In a case where the user terminal with multiple antennas uses only one or more of the multiple antennas, the vector $b_k$ may be initialized by adjusting the size of channel state information.

Lastly, a plurality of transmission channels may be allocated to one user by allocating a plurality of vectors $b_k$ to one user terminal. Alternatively, only one transmission channel may be allocated to one user by removing, after a user terminal is scheduled, the remaining vectors allocated to the user terminal.

Figure 3:
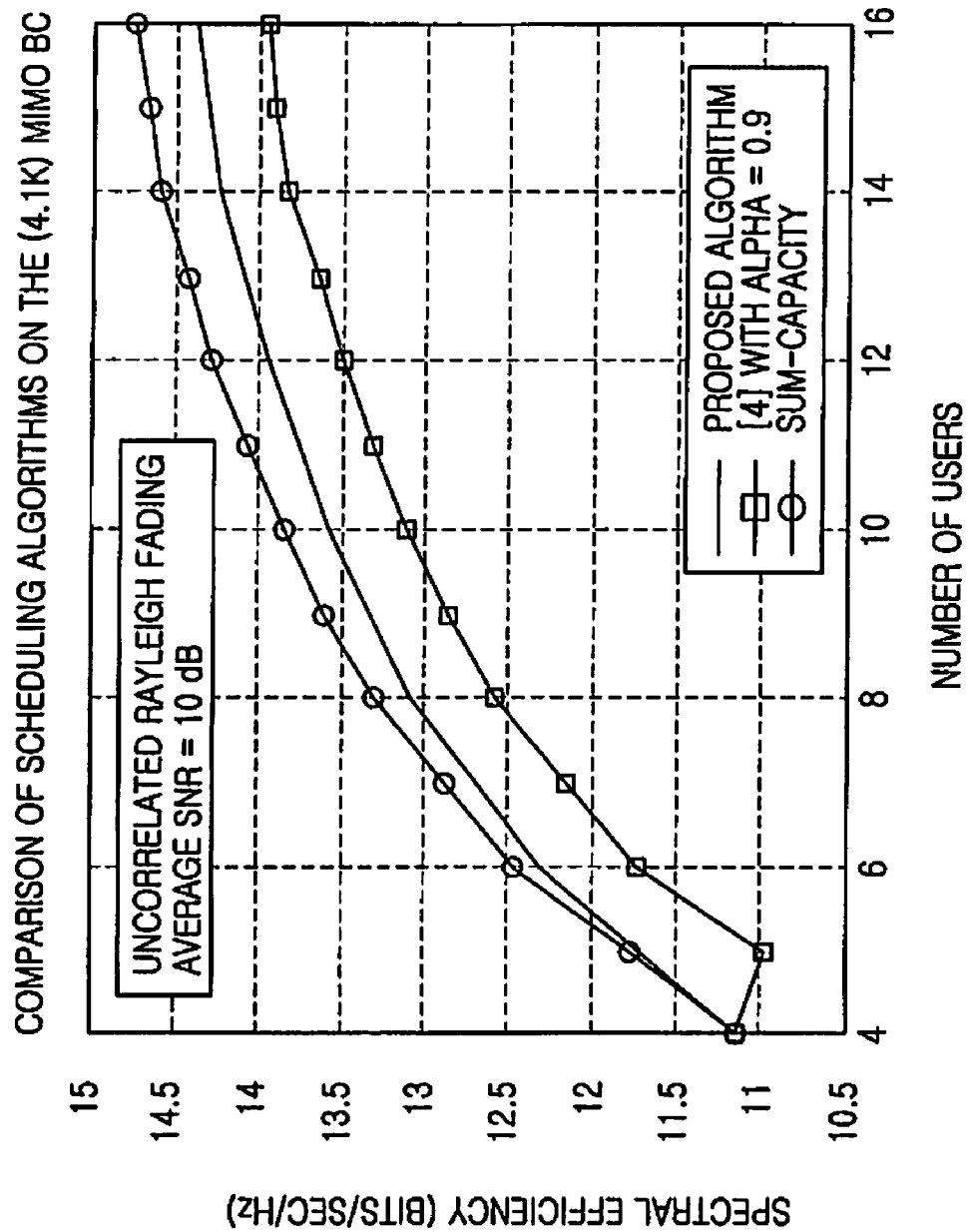
FIG. 3 is a graph comparing the performance of the conventional technology with the performance of the present invention.

FIG. 3 is a graph comparing the performance of the conventional technology with the performance of the present invention. It is assumed that a base station has four TX antennas, each user terminal has one RX antenna, and an average Signal-to-Noise Ratio (SNR) is 10 dB.

Referring to FIG. 3, the proposed algorithm of the present invention fails to achieve the sum capacity (i.e., the theoretical maximum transmission capacity) because data can be simultaneously transmitted to only N user terminals. However, the algorithm of the present invention can provide better performance than the conventional algorithm using a zero-forcing beamforming technique.

The computation amount of the proposed algorithm and the computation amount of the conventional algorithm are compared in Table 1 below.

TABLE 1

| | Multiplication | Division |
|---|---|---|
| Scheduling algorithm based on successive projection scheme | about $(1.25K - 0.2N)N^4$ | $(0.33K - 0.2N)N^3$ |
| Proposed algorithm | about $3KN^2$ | N |

In Table 1, N denotes the number of TX antennas of a base station and K denotes the total number of user terminals in a sector of a cell. For example, when N is 4 and K is 100, the computation amount can be expressed as Table 2 below.

TABLE 2

| | Multiplication | Division |
|---|---|---|
| Scheduling algorithm based on successive projection scheme | about 32,000 | 2,048 |
| Proposed algorithm | about 4,800 | 4 |

It can be seen from the above that the algorithm of the present invention can greatly reduce the computation amount when compared to the conventional algorithm.

As described above, according to the present invention, the base station can obtain a set of user terminals with the highest orthogonality by sequentially selecting user terminals that have the highest transmission capacity among multi-antenna user terminals in the multi-user MIMO system. Also, by transmitting data of the selected user terminals, the base station can provide a high transmission capacity while minimizing the influence of an interference signal. Also, the computation amount can be greatly reduced because there is no need to compute an inverse matrix.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for scheduling in a Multi-Input Multi-Output (MIMO) system, comprising the steps of:
    setting a vector, for each of a plurality of user terminals, based on channel state information from a respective user terminal, and computing a scalar, for each of the plurality of user terminals, from a respective vector, wherein the scalar indicates a channel state of the respective user terminal;
    selecting a user terminal that has a greatest scalar among unselected user terminals;
    updating a user set by adding the selected user terminal therein; and
    updating a vector and a scalar for each user terminal not included in the user set such that an attribute of a preselected user terminal is removed.

2. The method of claim 1, wherein the vector and the scalar are updated by projecting a vector of the user terminal not included in the user set on a null space of a subspace that has the selected user terminal as the basis.

3. The method of claim 1, wherein the vector $b_k$ is set as $$b_k = h_k$$

where $h_k$ is a (1×N) vector of complex numbers that indicates a channel between a $k^{th}$ user terminal and a transmitter and k denotes a search parameter for 1 through K user terminals.

4. The method of claim 1, wherein the vector $b_k$ is set as $$b_k = \sqrt{\rho_k} h_k$$

where $b_k$ denotes a vector of a $k^{th}$ user terminal, $h_k$ is a (1×N) vector of complex numbers that indicates a channel between the $k^{th}$ user terminal and a transmitter, $\rho_k$ denotes channel quality information, and k denotes a search parameter for 1 through K user terminals.

5. The method of claim 1, wherein the scalar $p_k$ is initialized as $$p_k = \|b_k\|^2$$

where $b_k$ denotes a vector of a $k^{th}$ user terminal, the scalar $p_k$ is a value indicating the channel state of each user terminal, which is used as a condition value for a scheduling process, and k denotes a search parameter for 1 through K user terminals.

6. The method of claim 1, wherein the above steps are repeated as many times as a number of user terminals that are to receive data simultaneously.

7. The method of claim 1, wherein the vector is set to one of an eigenvector computed using a channel matrix of each user terminal, a product of the computed eigenvector and an eigenvalue corresponding to the computed eigenvector, and a size of channel state information of each user terminal.

8. The method of claim 1, further comprising normalizing a vector of the selected user terminal after the step of updating the user set.

9. The method of claim 8, wherein the normalizing step comprises the step of initializing the vector of the selected user terminal as $$b_{u_n} = b_{u_n}/\sqrt{p_{u_n}}$$

where $u_n$ denotes a selected user terminal, $b_{u_n}$ denotes a vector of the selected user terminal $u_n$, and $p_{u_n}$ a scalar of the selected user terminal $u_n$.

10. The method of claim 1, wherein the vector and the scalar are updated as $$b_k = b_k - (h_k b_{u_{n-1}}{}^*) b_{u_{n-1}}$$

$$p_k = b_k h_k{}^*$$

where $b_k$ denotes a vector of the $k^{th}$ user terminal, $p_k$ denotes a scalar of the $k^{th}$ user terminal, $h_k$ is a (1×N) vector of complex numbers that indicates a channel between the $k^{th}$ user terminal and a transmitter, * denotes a complex transpose, k denotes a search parameter for 1 through K user terminals, and $u_{n-1}$ denotes the preselected user terminal.

11. An apparatus for scheduling in a Multi-Input Multi-Output (MIMO) system, comprising:
    a channel state feedback unit for estimating a channel state and feeding back channel state information; and
    a multi-user scheduler for setting a vector, for each of a plurality of user terminals, based on channel state information from a respective user terminal, and computing a scalar, for each of the plurality of user terminals, from a respective vector, wherein the scalar indicates a channel state of the respective user terminal, selecting a user terminal that has the greatest scalar among unselected user terminals, updating a user set by adding the selected user terminal therein, and updating a vector and a scalar for each user terminal not included in the user set such that an attribute of a preselected user terminal is removed.

12. The apparatus of claim 11, wherein the multi-user scheduler repeats the above steps as many times as a number of user terminals that will receive data simultaneously.

13. The apparatus of claim 11, further comprising:
    an information collector for outputting data of selected user terminals among all of the user terminals; and
    a preprocessor for precoding data corresponding to the selected user terminals in a predefined scheme and transmitting resulting data to respective users through a predetermined number of TX antennas.

14. The apparatus of claim 11, wherein the multi-user scheduler normalizes a vector of the selected user terminal after updating the user set.

* * * * *